(12) United States Patent
Sandell et al.

(10) Patent No.: US 12,534,554 B2
(45) Date of Patent: Jan. 27, 2026

(54) HIGHLY EFFICIENT C6 INERT VENT FOR GAS PHASE POLYETHYLENE PRODUCTION

(71) Applicant: ExxonMobil Chemical Patents Inc., Baytown, TX (US)

(72) Inventors: David J. Sandell, Sparks, NV (US); Corrine L. Brandl, Corpus Christi, TX (US); Jonathan R. Gallacher, Beaumont, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 687 days.

(21) Appl. No.: 17/759,454

(22) PCT Filed: Feb. 5, 2021

(86) PCT No.: PCT/US2021/016900
§ 371 (c)(1),
(2) Date: Jul. 26, 2022

(87) PCT Pub. No.: WO2021/173326
PCT Pub. Date: Sep. 2, 2021

(65) Prior Publication Data
US 2023/0103411 A1    Apr. 6, 2023

Related U.S. Application Data

(60) Provisional application No. 62/981,810, filed on Feb. 26, 2020.

(51) Int. Cl.
C08F 210/16 (2006.01)
C08F 2/01 (2006.01)
C08F 2/34 (2006.01)

(52) U.S. Cl.
CPC .............. *C08F 210/16* (2013.01); *C08F 2/01* (2013.01); *C08F 2/34* (2013.01)

(58) Field of Classification Search
CPC .............. C08F 210/16; C08F 2/01; C08F 2/34
See application file for complete search history.

(56) References Cited

U.S. PATENT DOCUMENTS 4,003,712 A    1/1977    Miller
4,302,566 A    11/1981   Karol et al.
(Continued)

*Primary Examiner* — Rip A Lee
(74) *Attorney, Agent, or Firm* — C. Tumey Law Group PLLC

(57) ABSTRACT

Method of improving the efficiency of polyolefin production comprising: performing a reaction to yield (1) a product stream comprising a polyolefin, and (2) a purge stream, wherein the purge stream comprises unreacted monomers, inert impurities and saturated co-monomers; compressing the purge stream in a first stage compressor to create a first compressed stream; cooling the stream first compressed stream in a cooler to create a cooled stream; directing the cooled stream to a first drum, to create a waste liquid stream and a first drum stream; removing the waste liquid stream from the first drum; compressing the first drum stream in a second stage compressor to create a second compressed stream; condensing the second compressed stream to produce a condensed stream; processing the condensed stream in a second drum to produce a second drum gas stream and a second drum liquid stream; and, sending at least a portion of the second drum liquid stream to a polyolefin reactor.

17 Claims, 3 Drawing Sheets

(56) References Cited

U.S. PATENT DOCUMENTS

| | | | |
|---|---|---|---|
| 4,588,790 | A | 5/1986 | Jenkins, III et al. |
| 5,066,736 | A | 11/1991 | Dumain et al. |
| 5,352,749 | A | 10/1994 | DeChellis et al. |
| 5,462,999 | A | 10/1995 | Griffin et al. |
| 5,521,264 | A | 5/1996 | Mehra et al. |
| 5,741,350 | A * | 4/1998 | Rowles .................. F25J 3/066 95/177 |
| 5,834,571 | A | 11/1998 | Bernier |
| 6,458,900 | B1 | 10/2002 | Aittamaa et al. |
| 7,582,709 | B2 | 9/2009 | Goossens et al. |
| 9,181,361 | B2 * | 11/2015 | Blood ...................... C08J 11/02 |
| 10,478,796 | B2 | 11/2019 | Lammens et al. |
| 10,640,582 | B2 * | 5/2020 | Bronsaer .............. B01D 5/0081 |
| 11,851,518 | B2 * | 12/2023 | Blood .................... B01D 3/322 |
| 2004/0236040 | A1 | 11/2004 | Mihan et al. |
| 2010/0004407 | A1 | 1/2010 | Goossens et al. |
| 2019/0218319 | A1 | 7/2019 | Pannell |
| 2021/0246234 | A1 | 8/2021 | Blood et al. |

* cited by examiner

PRIOR ART

HIGHLY EFFICIENT C6 INERT VENT FOR GAS PHASE POLYETHYLENE PRODUCTION

CROSS-REFERENCE OF RELATED APPLICATIONS

This application is a National Phase Application claiming priority to PCT Application Serial No. PCT/US2021/016900, filed Feb. 5, 2021, which claims the benefit of U.S. Provisional Application 62/981,810, filed on Feb. 26, 2020, entitled "Highly Efficient C6 Inert Vent For Gas Phase Polyethylene Production", the entireties of which are incorporated by reference herein.

FIELD OF INVENTION

The present disclosure relates to polyolefin synthesis and limiting the buildup of C6, C5 and/or C4 impurities in gas phase polyolefin production, especially gas phase polyethylene ("PE") production.

BACKGROUND

Polyolefin syntheses often include a monomer and a comonomer where the comonomer has a higher carbon-number than the monomer. For example, a polyethylene may be synthesized using ethylene monomer and 1-hexene comonomer. The comonomer is typically high purity, for example 99%, and includes impurities that are primarily inert isomers (in the prescribed reaction), and saturates of the comonomer (e.g., N-hexane). Cooling agents, such as N-butane, isobutane, and isopentane, may also be used to cool the reaction.

In this instance, unused ethylene, unused 1-hexene, N-hexane, N-butane and isopentane are recirculated to the reactor. The most difficult impurities to remove are the saturated co-monomers, such as N-hexane. They are heavy and non-reactive and easily returned to the reactor. It is not economical to include a distillation column for the recovery system. Therefore, after the polyethylene is produced, the bulk of the PE is removed and the remaining components stream is typically compressed and condensed (including C6, C5 and C4 components), returned to the reactor and a slip stream is sent to flare for the heavy C6 components. The vented/flared unreacted components stream includes volatile organic compounds of environmental concerns. Further, other components in the polymerization process (e.g., nitrogen used for purging) are lost in the non-selective venting/flaring process, which wastes resources and increases costs. So, it would be desirable to minimize or eliminate the need for flaring such a slip stream.

As one skilled in the art will recognize, describing a stream as a "remaining components" stream or the like does not limit the composition of said stream to be 100% unreacted components, but only that the stream comprises some level of the unreacted components.

In the prior art, buildup of inert impurities, such as N-hexane in polyethylene production, could be limited by a tail-end recovered liquids vent. Unfortunately, this causes high amounts of other valuable hydrocarbons to be inadvertently lost. At the tail-end's venting location, the desirable hydrocarbons being recovered also condense because their condensation is far below the dew point of the mixture and therefore a portion of the desirable hydrocarbons dilute the concentration of the impurities. This results in a low concentration of the inert impurities, so an undesirably high flow rate to the vent must be used in order to limit the buildup of the inert impurities in the polyolefin (such as PE) reactor. While soluble losses from the reactor remain similar at optimized reactor concentrations, gaseous losses increase. This results in higher raw material cost, unloading logistics, capital expenditure for larger charge pumps and environmental harm (such as that caused by venting or flaring). Additionally, this restricts the practical gas phase polyethylene (or other polyolefin) grade mix based on stickiness.

As described above, the unreacted components including the unreacted monomer and unreacted comonomer and the inert impurities and saturates of the comonomer are included in the reactor recycle stream back to the reactor after a slip stream is taken off. For example, for comonomers having 6 or more carbons (C6+ comonomer), the concentration of the C6+ components increases over time, which reduces the softening temperature of the polyolefin and narrows the operating window of the reactor. To alleviate the tendency towards softening point depression as the polymerization process progresses over time, current processes vent and/or flare the unreacted components stream periodically throughout the polymerization process to lower the buildup of these species.

For example, FIG. 1 illustrates how venting is used to control the C6+ components in a polyethylene reactor in the prior art. A polyethylene reactor 150 discharges its unreacted components stream 108 into a compressor 101, which then discharges compressed stream 109 into a condenser 102. Condensed stream 110 is then discharged into a drum 103. This drum exit stream 112 is then discharged to a second compressor 104. Second compressed stream 114 then enters a second condenser 105. Second condensed stream 115 is collected in a second drum 106. The liquid in second drum exit stream 119 has a slip stream 121 sent to vent or flare, while the bulk of the liquid 120 is sent back to the PE reactor (noting that liquid 120 may be pumped to the reactor by a pump (not shown)). The gas from the second drum 106 is sent via stream 116 to a membrane separator 107. The recovered gases stream (or "recovered gases") 118 is sent back, directly or indirectly (e.g., potentially via an additional compressor, not shown), to the PE reactor, while the light inerts 117 are vented or sent to flare. Over time, the slip stream must become larger because there is a small concentration of the inert impurities in the slip stream and a larger slip stream is used to rid of more inert impurities, to bring the inert impurities (including saturated comonomers) concentration in the PE reactor back in line.

Due to the exothermic nature of the PE reaction, the speed of the reaction is limited by the rate of heat removal. Cooling agents (also called "Induced Condensing Agents" or ICAs), such as N-butane and isopentane, among others known in the art, are used to help cool the PE reaction. However, the C6 inerts, N-butane and isopentane (and/or other ICAs that may be employed) dissolve into the polymer resin and over time, the resin becomes too sticky. Methods and processes described herein may be useful in removing the C6 inerts (and/or other targeted impurities), so that the N-butane and isopentane (and/or other components such as other ICAs) may be used more efficiently to cool the PE reactor and allow the reaction to run more quickly.

Nonlimiting examples of polyolefin syntheses, reactors, and/or corresponding separation zones/processes are described in U.S. Pat. Nos. 4,003,712, 4,588,790, 4,302,566, 5,066,736, 5,352,749, 5,462,999, 5,834,571, 7,582,709, and 10,478,796 and US Patent Application Publication Nos. 2004/0236040, 2010/0004407, and 2019/0218319, which are incorporated herein by reference.

SUMMARY OF INVENTION

The present disclosure includes a method comprising: polymerizing a monomer, such as ethylene, having 4 or less carbons (C4– monomer) and a comonomer, such as 1-hexene, having 6 or more carbons (C6+ comonomer) in the presence of an inert isomer of the comonomer and/or a saturate of the comonomer (known hereinafter as "inert isomer/saturate of the comonomer"), such as N-hexane, to yield a product stream comprising a polymer, unreacted monomer, unreacted comonomer, the inert impurities of the isomer/saturate comonomer, and the cooling agents, such as N-butane and/or isopentane; separating the product stream into two or more streams comprising: (a) a polymer stream comprising the polymer and (b) an unreacted components stream (also referred to as "purge stream") comprising the unreacted monomer, unreacted comonomer, and inert impurities (e.g., isomer/saturate of the comonomer, among others). One of ordinary skill in the art will appreciate that these 2 streams may not be 100% of the desired components and may include other components as they are not 100% pure. The purge stream is then compressed (e.g., in a first stage compressor) and cooled (e.g., in a cooler), forming a cooled stream. The cooled stream is directed to a first drum, where a liquid is removed from the cooled stream (said removed liquid a "waste liquid stream") and a gas exits the first drum (exiting gas being a "first drum stream"). The first drum stream (gas) is then compressed (e.g., in a second stage compressor) and condensed, forming a condensed stream. The condensed stream is sent to and processed in a second drum to produce a second drum gas stream and a second drum liquid stream. The second drum gas stream is separated with a membrane separator or other suitable method of separation into a reactor feed to send back to the reactor and a light inerts, which is collected, vented or flared. The second drum liquid stream is suitable for recycling to earlier points in the system, and may alternatively be referred to as a "recovered liquid" or "recovered liquid stream." At least a portion of the second drum liquid stream may be recycled to the polyolefin reactor. Preferably, a further portion of the second drum liquid stream may be recycled as an intermediate recycle stream, for instance such further portion of the second drum liquid stream ("intermediate recycle stream") may be recycled to the cooled stream upstream of the first drum, so as to form a mixed stream that is fed to the first drum; or such intermediate recycle stream may be sent directly to the first drum (such that the cooled stream and intermediate recycle stream are both fed to the first drum).

As noted, inert impurities may arise from various sources, such as isomers of monomers (e.g., saturated or non-alpha-olefinic isomers), and/or cooling agents used in the process (also referred to as Induced Condensing Agents (ICAs), noting that although some example ICAs are discussed in connection with various embodiments herein, it will be appreciated that any other of various known ICAs may be used (and therefore present in the product stream as part of the inert impurities)).

The present disclosure also includes a system comprising: a polymerization reactor fluidly coupled to a first compressor, the first compressor configured to receive a stream from the polymerization reactor and create a first compressed stream; a cooler fluidly connected to the first stage compressor and configured to receive the first compressed stream from the first stage compressor, and create a cooled stream; a first drum fluidly connected to the cooler with an inlet and configured to receive the cooled stream, and wherein the first drum is configured to output a first drum liquid stream via a first drum liquid outlet and to output a first drum gas stream via a first drum gas outlet; a second compressor fluidly connected to the first drum and configured to receive the first drum gas stream from the first drum and further configured to create a second compressed stream; a condenser fluidly connected to the second compressor and configured to receive the second compressed stream from the second compressor; and a second drum fluidly connected to the condenser, and further configured to output a second drum liquid stream via a second drum liquid outlet, and to output a second drum gas stream via a second drum gas outlet. The system may further be configured in a manner to include an intermediate recycle; e.g., the first drum may be configured to receive a portion of the second drum liquid stream as an additional input stream. This portion of the second drum liquid stream may be considered as an intermediate recycle stream. A further portion of the second drum liquid stream may be returned to the polymerization reactor (optionally with heavy inerts split from such further portion of the second drum liquid stream).

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
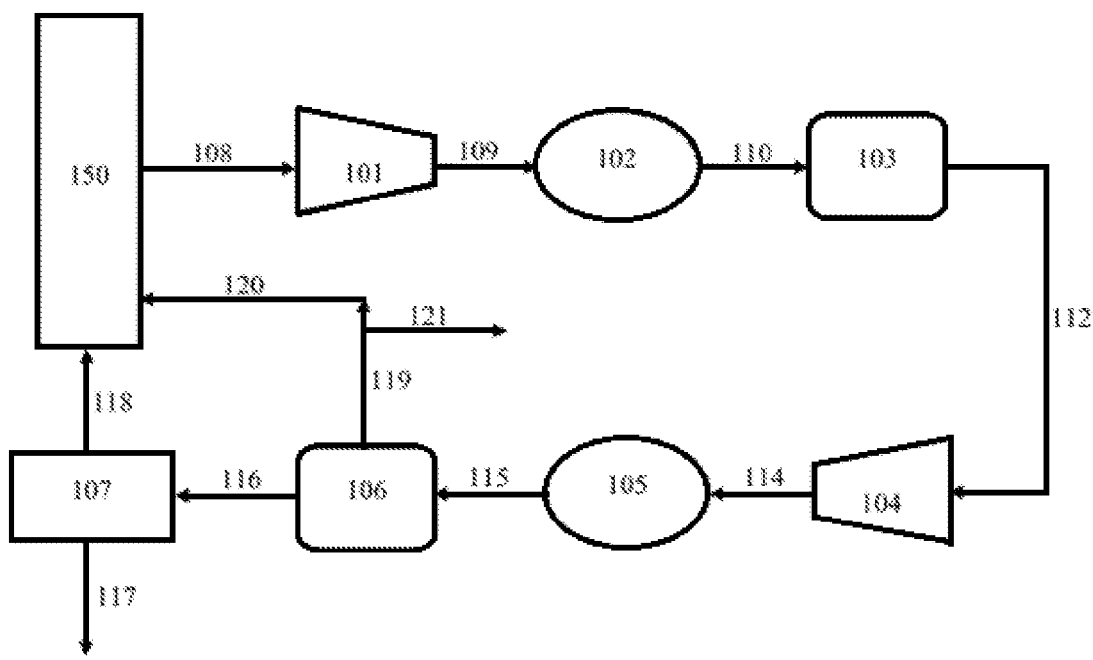
FIG. 1 illustrates how venting is used to control the C6+ components in a polyethylene reactor in the prior art.

As used herein, "Cn" refers to hydrocarbons having n number of carbons. As used herein, "Cn-" refers to one or more hydrocarbons having n or fewer number of carbons (e.g., C5– can comprise C5 hydrocarbons, C4 hydrocarbons, and C3 hydrocarbons, alternatively C5– can comprise C4 hydrocarbons). As used herein, "Cn+" refers to one or more hydrocarbons having n or more number of carbons (e.g., C6+ can comprise C6 hydrocarbons, C7 hydrocarbons, and C8 hydrocarbons, alternatively C6+ can comprise C6 hydrocarbons, alternatively C6+ can comprise C8 hydrocarbons).

The term "reactor" means the polyolefin reactor, unless further denoted in this specification.

As used herein, the term "polyethylene" means and includes a homopolymer or copolymer including ethylene-derived units of about 50 mol % or greater, about 70 mol % or greater, about 80 mol % or greater, about 90 mol % or greater, about 95 mol % or greater, or 100 mol % (in the case of a homopolymer). One or more comonomers (most often one type of comonomer) may form the rest of the polyethylene (e.g., a C4 or greater comonomers, such as a C4, C6, or C8 comonomer, and in particular a C4 or C6 comonomer such as 1-butene or 1-hexene).

The present disclosure relates to polyolefin synthesis methods and systems where an unreacted components or "purge" stream is further separated to produce (1) a liquid with a high concentration of impurities, such as, without limitation C6 isomers, (2) a reactor gas feed with a high concentration of unused reactants to be recycled to the reactor, (3) a lighter inerts stream and (4) a recovered liquid with a high concentration of unused reactants to be recycled to the reactor. Advantageously, the methods and systems described herein improve the polymerization efficiency and production rate by reducing the concentration of impurities in a gas-phase reactor system while reducing emissions and reactant/diluent costs by recycling more unused reactants to the reactor. In particular, it is believed that such methods and systems help to economically minimize accumulation of C6 inerts in the system.

The systems and methods described herein may be implemented particularly in various polyolefin syntheses that employ a C4- (e.g., C4, C3, or C2) monomer (hereinafter "monomer") and a C6+ comonomer (hereinafter "comonomer"). Examples of monomer/comonomer combinations include, but are not limited to, ethylene/1-hexene, ethylene/1-octene, propylene/1-hexene, propylene/1-octene, ethylene and propylene/1-hexene, ethylene and propylene/1-octene, and the like. In the last two examples, a mixture of ethylene and propylene are considered the monomer portion herein, and either the ethylene or the propylene may be at a higher concentration than the other.

The impurities venting location is preferably located where condensing conditions are closest to the temperature where the impurity targeted to be removed is preferentially condensed. Under these conditions, the inert impurities, including but not limited to C6+ inert impurities in gas phase PE production, preferentially condense along with a relatively limited amount of the lighter hydrocarbons. By way of example, this location may be at the inter-stage knock-out drum (otherwise referred to as a first knock-out drum) of a two stage vent recovery compressor system, from which the recovered liquid is ultimately obtained (e.g., as an exit stream from the second stage knock-out drum of the system).

At least a portion of the recovered liquid stream is recycled to the polymerization reactor. Optionally, a further portion of the recovered liquid stream may be recycled to an intermediate point in the system, e.g., upstream of the first knock-out drum (e.g., to the drum directly, or to the stream exiting the inter-stage cooler and entering the first knock-out drum, or to the exit of the inter-stage cooler). This can improve cooling before entry to the first knock-out drum (also referred to as "first drum"), induces condensation of the entering inter-stage gases which will preferentially condense an inert impurity (such as, without limitation, N-butane and isopentane, and/or C6+ impurities) in the liquid for venting, and sends a gas which has already been separated from the heavy impurities, to flash off N-butane and isopentane for second stage re-recovery. The ordinarily skilled artisan will also appreciate that employing a recycle stream in this manner helps induce condensation insofar as it may increase concentration of C4-C6 (or heavier) components entering the first knock-out drum (as compared to a system that does not employ the recycle stream). In particular, this may increase dew point of the compounds within the first drum (making it easier to condense and remove the condensable species). Furthermore, as also noted, the intermediate recycle can provide a cooling effect, which also may aid in condensation. In sum, raising dew point and lowering temperature are both effective ways to condense and remove inerts (e.g., C6+ inerts), and both are facilitated by the intermediate recycle. One with ordinary skill in the art will recognize when it may be preferable to use one or the other based, e.g., upon the exact composition and/or flowrate of the intermediate recycle and/or condensing gases.

One of the benefits of employing any of the presently described methods, as discussed in more detail herein, includes economically minimizing accumulation of heavy inerts (C6+ inerts) in the reaction system. In particular, a more efficient impurities vent system will result in a more economical commercial production of more sticky grades (such as very- or ultra-low density and/or high melt index) that are optimized light Induced Condensing Agent ("ICA") mixtures at high concentrations, such as Very Low Density Polyethylene (VLDPE) (and lower density) grades that use high concentration, lighter ICA blends. Generally, the upper limit of the reactor temperature is limited at least in part by the softening temperature of the resultant polyolefin because the closer the reactor temperature is to the softening temperature, the more sticky the polyolefin becomes. A sticky polyolefin can build up on the reactor sidewalls and clog downstream flow paths, which requires a shutdown to clean the system. One contributing factor to the stickiness of a polyolefin is the concentration of liquid hydrocarbons (e.g., C4+ hydrocarbons, especially C6+ hydrocarbons) that can solubilize or otherwise disperse in the polyolefin. Higher concentrations of these hydrocarbons solubilized in the polyolefin cause a lowering of the softening temperature of the polyolefin. Therefore using the configurations shown herein will improve the production of more sticky grades, e.g., by helping minimize accumulation of C6+ impurities. It will be appreciated that although some example condensing agents are mentioned, it is contemplated that the present invention could be carried out with a variety of any known Induced Condensing Agents (ICAs), e.g., propane, n-butane, isobutane, n-pentane, isopentane, isohexane, etc. See, for example, US 2019/0218319, Paragraphs [0004] & [0057] for description of various ICAs. In general, as the ordinarily skilled artisan will recognize, suitable ICA can include any desirable mixture of C3 to C6 hydrocarbons lacking reactive alpha-olefins (preferably C3 to C6 alkanes).

As noted previously, according to various embodiments described herein, an unreacted components stream is further separated to produce (1) a liquid with a high concentration of impurities, such as, without limitation C6 isomers, (2) a reactor gas feed (or "reactor feed") with a high concentration of unused reactants to be recycled to the reactor, (3) a lighter inerts stream and (4) a recovered liquid with a high concentration of unused reactants to be recycled to the reactor.

The liquid with a high concentration of impurities comprises C4-C12 inert impurities, preferably C6-C10 impurities, more preferably C6 impurities, at about 25–50 mol % of the liquid. Any of C4-C12 may be targeted in this liquid. One embodiment which targets C6 inert impurities in PE production has a liquid composition of C6 inert impurities at about 25-50 mol % of the liquid, and C8 and/or C10 at about 1-2 mol % of the liquid. However, other concentrations of C6 inert impurities in the liquid are also contemplated in various other embodiments.

The reactor gas feed may be further separated into 2 streams. One stream comprises about 85-100 mol % nitrogen, more preferably about 95 mol % nitrogen, and ethylene. Another stream comprises about 10-25 mol %, more preferably 15 mol % ethylene and nitrogen.

The lighter inerts stream comprises nitrogen, ethylene and residual heavy inerts. One embodiment comprises about 80-100 mol % of ethylene and nitrogen, up to about 10 mol % N-butane and various ppms of: 1-hexene, isopentane, N-hexane and N-butane. Other C6 isomers may also be present in the inerts, as noted previously. Further, other isomers of the just-noted compounds may also be present (e.g., isobutane).

The recovered liquid targets the unreacted components, typically C4, C5 and C6 components, to return to the PE reactor. One embodiment comprises 0-80 mol % of C4 and/or C5 components. One embodiment comprises about 60-80 mol % of N-butane and isopentane, about 10-20 mol % 1-hexene and about 10-20 mol % ethylene.

Figure 2:
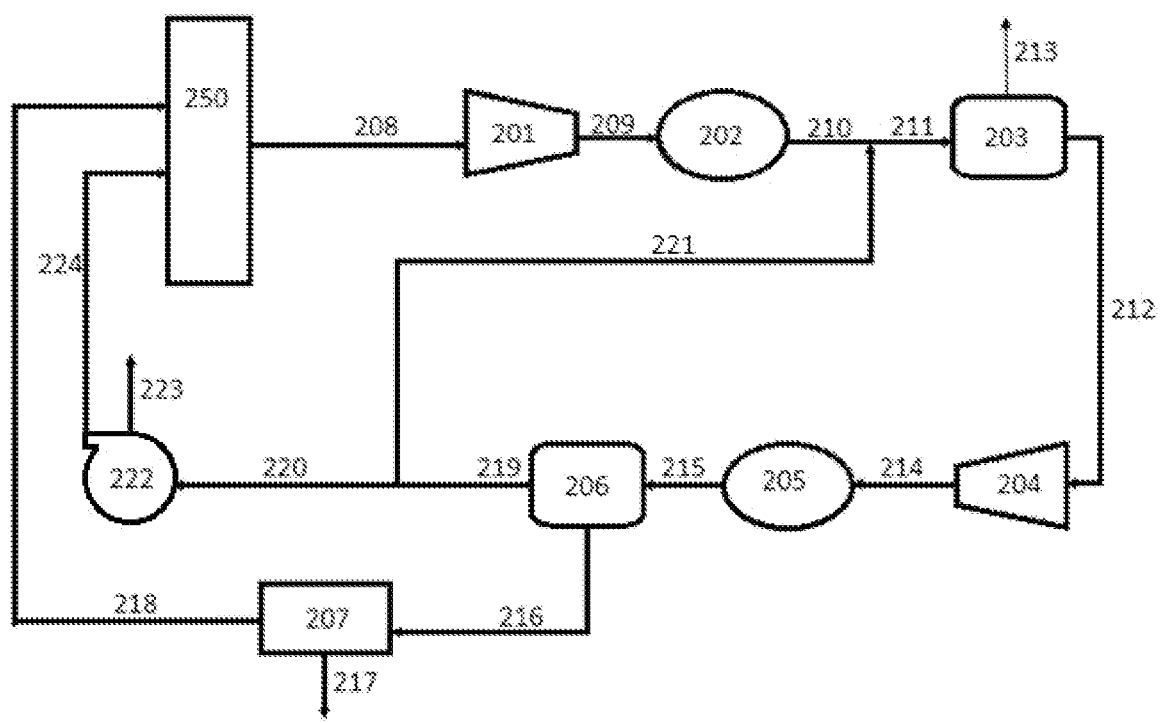
FIG. 2 illustrates a flowchart of a nonlimiting example of a process of controlling for unreacted components and impurities.

FIG. 2 illustrates a diagram of a nonlimiting example of a process of the present disclosure. A purge stream 208 of unreacted components from polyethylene reactor 250 is discharged to a first compressor 201 (for simplicity, the solid product discharge and separation systems are not shown in FIG. 2, since the focus is on the purge stream and treatment of its component). First compressed stream 209 exits the first compressor 201, and is then processed in a first interstage cooler 202. Optionally, an intermediate recycle stream 221 (discussed in more detail below) is injected into the first interstage cooler's exit stream 210 to make a mixed stream 211. Optionally, and not shown, the intermediate recycle stream 221 may be injected directly into the first interstage drum 203 (this also may simply be referred to as a "first drum"), or directly to the exit of the first interstage cooler 202. The intermediate recycle stream 221 is at a cool temperature, which aids in cooling the mixed stream 211, and as discussed in more detail above, may also aid in raising the dew point of the mixed stream 211 due to presence of heavier (e.g., C6+) inerts. The mixed stream 211 proceeds to the first interstage drum 203, wherein a gas stream 212 is removed and sent to a second compressor 204, and a liquid stream 213 is removed and sent to flare, vented, or collected. The first interstage drum 203 may optionally be further cooled by indirect heat exchange. The liquid stream 213 comprises C4-C12 inert impurities, preferably C6-C10 impurities, more preferably C6 impurities, at about 25-50 mol % of the liquid. Any of C4-C12 may be targeted in this liquid.

Gas stream 212 is compressed in second compressor 204 to produce compressed stream 214, which is then condensed in a recovery condenser 205, and then the condensed stream 215 is sent to a second drum 206, which discharges a second drum gas stream 216 and a second drum liquid stream 219. The second drum gas stream 216 optionally is separated by a membrane separator 207 or any other separator, yielding a gas reactor feed 218 for recycling to the polyethylene reactor 250 (either directly or indirectly, e.g., with the aid of one or more compressors or pumps (not shown in FIG. 2)) and a lighter inerts stream 217, which may be sent to flare, vent or collected. The lighter inerts stream 217 comprises nitrogen, ethylene and residual heavy inerts. The gas reactor feed 218 comprises nitrogen and ethylene and optionally may be further separated. The second drum liquid stream 219 from the second drum 206 is collected as recovered liquids; all or at least a portion may be recycled to the polyethylene reactor 250. As shown in FIG. 2, a portion (recycle stream 220) is recycled to the polyethylene reactor 250. This portion comprises unreacted components, such as, without limitation, C4, C5 and/or C6 components that have been targeted to return to the polyethylene reactor 250, and some heavy inerts. Pump(s) 222 pumps recovered liquid stream 224 to the polyethylene reactor 250 and a heavy inerts stream 223 to a flare.

A further portion of second drum liquid stream 219 is also split off as the intermediate recycle stream 221, which as discussed above may be directly injected into the exit of the first interstage cooler 202, directly sent to the first drum 203, or, as shown in FIG. 2, combined with the first interstage cooler's exit stream 210 to become the mixed stream 211, which is fed to the first interstage drum 203. The intermediate recycle stream 221, as noted, may contain elevated concentrations of C4-C6+ inerts, and is further at a relatively cool temperature, such that it may aid in cooling and/or raising the dew point of mixed stream 211, thereby aiding in the condensation of heavier inerts in first interstage drum 203.

Two of the benefits of this process include a more pure gas reactor feed 218 (e.g., depleted in C6+ inerts, as described herein) and more pure recycle stream 220 are being fed back to the polyethylene reactor, and a liquid stream 213 (more enriched in heavy inerts, e.g., C6+ inerts) is taken off for venting, flare, or collection. The reactant feed and recovered liquids are relatively more pure in comparison to the prior art (using only the tail-end recovered liquids vent noted previously).

In one embodiment, the intermediate recycle stream 221 is mixed into the exit stream 210 from the cooler and produces a significantly cooler mixed stream through direct heat exchange. Optionally, the first interstage drum 203 may additionally be cooled via indirect heat exchange, for example without limitation with chilled water internal and/or external tubes. In one embodiment, the bulk of the cooling of the components in the mixed stream is achieved through a sufficient amount of the intermediate recycle stream being present in the mixed stream and the indirect heat exchange of the drum is used to fine-tune the temperature to reach a set temperature.

Optionally, the flow rate of the intermediate recycle stream 221 is controlled for direct contact cooling in the mixed stream 211, and/or the intermediate recycle stream 221 may be introduced separately directly into the first interstage drum 203. Any condensable species in the mixed stream (for example without limitation C6, C5, C4 or heavier than C6 components) may be targeted so that the temperature in the first interstage drum 203 is tailored to preferentially condense the components targeted for removal. The flow rate of the intermediate recycle stream 221 will be adjusted to reach the targeted temperature in the drum. The ordinarily skilled artisan will also appreciate that employing a recycle stream in this manner would increase concentration of C4-C6 (or heavier) components in the mixed stream 211 (as compared to a system that does not employ the recycle stream). This in turn may increase dew point of the stream (making it easier to remove the just-noted targeted condensable species). This could even provide for operating the drum at higher temperatures for even faster throughput. Further, by targeting specific components, certain target grades of polyolefins, for example without limitation higher grade polyethylene, may be produced at higher rates, while concerns about excessive accumulation of heavier (C4-C6+, especially C6+) inerts are mitigated. As noted, some such grades may in particular include very- or ultra-low density grades. In some embodiments, the process may even be used to make oligomers, particularly of even number carbons which are saturated and linear hydrocarbons.

One embodiment targets the removal of N-hexane from polyethylene production streams by achieving the temperature to preferentially condense N-hexane in the drum. In one embodiment, an undesirable component(s) (for example without limitation hexene co-polymers, and/or octane impurities) is/are targeted by achieving the temperature to preferentially condense the undesirable component in the drum.

It is recognized that the efficiency of the vent gas processing described herein may be affected by the amount of non-condensible gas in the purge stream 208. As the amount of the non-condensible gases (such as, without limitation, nitrogen and ethylene) in the purge stream 208 increases, it is possible that the processing could become more inefficient.

Further, as will be apparent to those skilled in the art, the systems and methods illustrated in this nonlimiting example may include additional components like compressors, membranes, valves, flow meters, heat exchangers, traps, and the like for proper and safe operation of said systems and methods.

Further, as will be apparent to those skilled in the art, several reactors may be running in parallel. Optionally, two or more reactors can feed streams to the compressor. Further, the reactor feeds and recovered liquids from more than one separation process may be used to feed one or more polyolefin reactor. One skilled in the art will recognize the suitable configurations based on the capacity of the reactors, and separation process.

Figure 3:
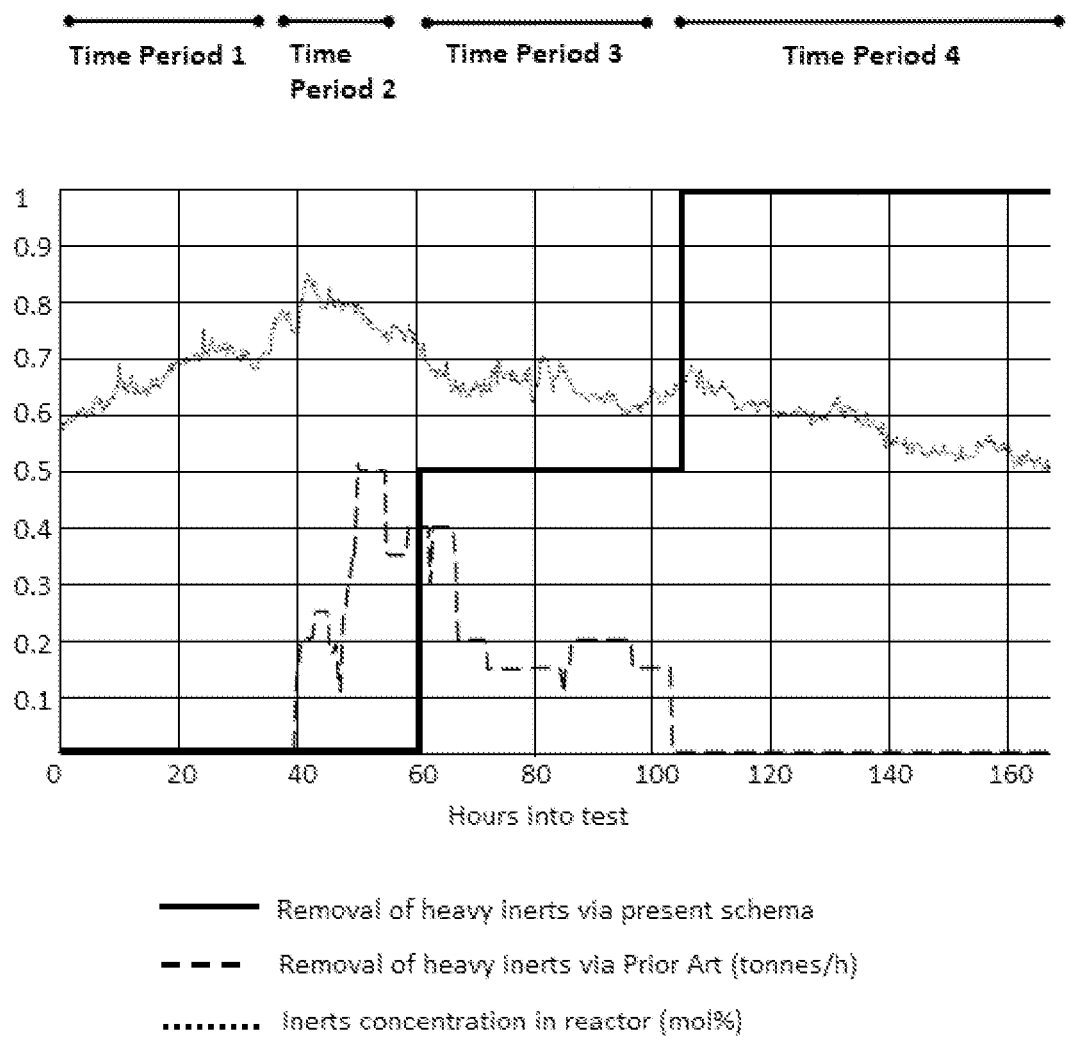
FIG. 3 is a graph of the data collected for the prior art configuration and an embodiment of the present invention.

In FIG. 3, Time Period 1 shows the data collected when no inert impurities are removed and instead accumulate at the rate of about 0.006 mol %/hr. Time Period 2 shows the conventional inerts removal as described in connection with the system reflected in FIG. 1. Inert impurities decrease briefly but then stabilize in the reactor. The dashed line in FIG. 3 represents the application of the FIG. 1 system for removal of inerts (in tonnes/hr). In Time Period 3, this reflects the data collected when the prior art system is intermittently operated and the present schema is alternately operated. The heavy solid line in FIG. 3 represents the application of the present schema for inerts removal (where 0=not in service; 0.5=intermittently in service; and 1.0=fully in service). The inert impurities remain stable even when the prior art system is only operated at half the usual venting rate, while intermittently employing the present schema. Time Period 4 shows the data collected for employing the present schema only. No prior art venting was performed in Time Period 4, and the inert impurities' concentration in the reactor decreases at a rate of about 0.003 mol %/hr. It can be seen that the required vent rate to stay below a C6+ inerts ceiling (impurities' concentration) in the reactor is reduced when employing the interstage vent per the present schema, versus using the tail-end vent technique of the prior art (FIG. 1).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Embodiments Disclosed Herein Include

A. Methods of polyolefin (such as polyethylene) production (which may improve efficiency in such production) comprising: performing a reaction between monomer and comonomer in a polyolefin reactor to yield a polymer product (eg., polyethylene) and a purge stream, wherein the purge stream comprises unreacted monomers, inert impurities and saturated isomers of co-monomers (which isomers may alternatively be referred to by the shorthand "saturated co-monomers"); compressing the purge stream in a first stage compressor to create a first compressed stream; cooling the first compressed stream in a cooler to create a cooled stream; directing the cooled stream to a first drum, to create a waste liquid stream and a first drum stream; removing the waste liquid stream from the first drum; compressing the first drum stream in a second stage compressor to create a second compressed stream; condensing the second compressed stream to produce a condensed stream; processing the condensed stream in a second drum to produce a second drum gas stream and a second drum liquid stream; and, sending at least a portion of the second drum liquid stream to the polyolefin reactor.

B. Systems for polyolefin (such as polyethylene) production, which may improve the efficiency of such production, comprising: a polymerization reactor fluidly coupled to a first compressor; the first compressor configured to receive a stream from the polymerization reactor and create a first compressed stream; a cooler fluidly connected to the first stage compressor and configured to receive the first compressed stream from the first stage compressor and create a cooled stream; a first drum fluidly connected to the cooler with an inlet and configured to receive the cooled stream, and wherein the first drum is configured to output a first drum liquid stream via an first drum liquid outlet and to output a first drum gas stream via a first drum gas outlet; a second compressor fluidly connected to the first drum and configured to receive the first drum gas stream via a first drum gas outlet and to create a second compressed stream; a condenser fluidly connected to the second compressor and configured to receive the second compressed stream; and, a second drum fluidly connected to the condenser and configured to receive the second compressed stream from the condenser, and wherein the second drum is configured to output a second drum liquid stream via an second drum liquid outlet and to output a second drum gas stream via a second drum gas outlet.

Each of embodiments A and B may have one or more of the following additional elements in any combination:
  Element 1: further comprising: introducing a portion of the second drum liquid stream to the cooled stream.
  Element 2: further comprising: separating the second drum gas stream with a membrane separator into a reactor feed and light inerts.
  Element 3: further comprising a second cooling after introducing a portion of the second drum liquid stream to the cooled stream, wherein the second cooling comprises an indirect heat exchange to fine-tune temperature of the mixed stream.

Element 4: further comprising a second cooling after introducing a portion of the second drum liquid stream to the cooled stream, wherein the second cooling comprises an indirect heat exchange to fine-tune temperature of the mixed stream.

Element 5: wherein the polyolefin is polyethylene.

Element 6: wherein the inert impurities comprise one or more of the group consisting of N-butane and isopentane.

Element 7: wherein the inert impurities comprise one or more of the group consisting of C4, C5, C6, C7, C8, C9, C10, C11, and C12 impurities.

Element 8: wherein the saturated co-monomers comprise N-hexane.

Element 9: wherein the unreacted monomers comprise ethylene and the unreacted comonomers comprise 1-hexene.

Element 10: wherein the purge stream comprises about 25-50 mol % inert impurities.

Element 11: wherein the light inerts comprises about 80-100 mol % ethylene and nitrogen.

Element 12: wherein the second drum liquid stream comprises about 60-80 mol % of isopentane and N-butane, about 10-20 mol % 1-hexene, and about 10-20 mol % ethylene.

Element 13: wherein the amount of the second drum liquid stream introduced to the cooled stream yields a set temperature in the drum, wherein the set temperature preferentially condenses at least one inert impurity.

By way of non-limiting example, exemplary combinations applicable to A and B include: [provide combinations of A, B, and C with Elements 1, 2, etc. For example, A or B with 2 and 11; A or B with 5; A with 1, 5, and 9; A with 1, 4, and 5; A with 1, 9, and 10; B with 5 and 9; B with 4 and 5; and B with 9 and 10.

To facilitate a better understanding of the embodiments of the present invention, the following examples of preferred or representative embodiments are given. In no way should the following examples be read to limit, or to define, the scope of the invention.

EXAMPLES

Example 1. Table 1 below shows the compositions of various modeled streams labeled in FIG. 2. Ethylene and 1-hexene are exposed to N-butane and isopentane (both for cooling) and nitrogen in the reactor and then the desired product is removed and the remaining stream is directed through a nitrogen purger. The unreacted gases from the reactor and purge gas [208] is directed to a compressor [201]. The stream [209] from the compressor is cooled in a cooler [202] before entering the first interstage drum (or "drum") [203]. The temperature of the drum [203] is targeted to preferentially condense C-6 inerts, especially N-hexane. which is then removed as the liquid stream [213], which may be collected, vented or sent to flare. The gas stream [212] from the drum [203] is directed to the second compressor [204]. The second drum liquid stream [219] has a portion recycled back to the mixed stream [211], such as the flow rate of the recovered liquid (which is cool) allows the temperature of the mixed stream [211] in the drum [203] to reach the targeted temperature without additional cooling. One of ordinary skill in the art would appreciate that streams [219], [221], [223] and [224] would have the same composition. Another portion of the recovered liquid [219] is sent back to the PE reactor with a high concentration of isopentane and isobutane.

TABLE 1

Example Compositions (mole percent)

| Component | Purge gas from [208] Reactor and Purger | Second Drum Liquid Stream [219] | Stream [209] entering cooler [202] | Gas stream [212] leaving first interstage drum [203] | Liquid stream [213] leaving first interstage drum [203] |
|---|---|---|---|---|---|
| Hydrogen | 0.0 | 0.0 | 0.0 | 0.0 | 0.0 |
| Nitrogen | 37.1 | 1.2 | 39.9 | 40.0 | 0.3 |
| Methane | 0.0 | 0.0 | 0.0 | 0.0 | 0.0 |
| Ethylene | 10.2 | 7.9 | 19.7 | 19.8 | 1.1 |
| Ethane | 0.3 | 0.4 | 0.5 | 0.5 | 0.0 |
| N-butane | 8.3 | 14.3 | 6.7 | 6.7 | 5.8 |
| Isopentane | 34.4 | 59.7 | 26.0 | 25.9 | 50.2 |
| 1-hexene | 6.6 | 11.3 | 4.8 | 4.8 | 27.4 |
| N-hexane and other C6+ inerts | 3.1 | 5.3 | 2.3 | 2.2 | 15.3 |

This example illustrates that the liquid taken to flare comprises a high concentration of C6 saturated comonomers and the recycled recovered liquid returned a high concentration of C5− isomers, as well as nitrogen, to the reactor. In particular, one can see that N-hexane is substantially more concentrated in the stream [213] (that is, the stream leaving the drum [203] and which may be sent, e.g., to flare), than in stream [219] with recovered liquid (approximately 3× more concentrated). The higher concentration of N-hexane (and other C6+ inerts) in the stream [213] means that less overall material needs to be flared, in order to flare the same amount of N-hexane as would be targeted by prior art systems' flares (that is, without this higher concentration of N-hexane, here on the order of approximately 3×, one would need to approximately triple the total material flared in order to remove the same total amount of N-hexane from the system). This illustrates the substantial reduction in flaring as one substantial benefit enabled by the presently disclosed systems and methods. And by reducing flaring (by, e.g., two-thirds), one can recover that much more valuable hydrocarbon. to the reactor.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of improving efficiency of polyolefin production comprising:
   performing a reaction between monomers and co-monomers in a polyolefin reactor to yield (1) a product stream comprising a polyolefin and (2) a purge stream, wherein the purge stream comprises unreacted monomer, unreacted comonomer, and inert impurities;
   compressing the purge stream in a first stage compressor to create a first compressed stream;
   cooling the first compressed stream in a cooler to create a cooled stream;
   directing the cooled stream to a first drum, to create a waste liquid stream and a first drum stream;
   removing the waste liquid stream from the first drum;
   compressing the first drum stream in a second stage compressor to create a second compressed stream;
   condensing the second compressed stream to produce a condensed stream;
   processing the condensed stream in a second drum to produce a second drum gas stream and a second drum liquid stream;
   sending at least a portion of the second drum liquid stream to the polyolefin reactor; and,
   introducing a further portion of the second drum liquid stream to the cooled stream, such that the cooled stream directed to the first drum is a mixed stream formed from combining said portion of the second drum liquid stream and the cooled stream.

2. The method of claim 1, wherein introducing the further portion of the second drum liquid stream to the cooled stream causes at least one inert impurity to condense in the second drum.

3. The method of claim 1, further comprising a second cooling after introducing said further portion of the second drum liquid stream to the cooled stream, wherein the second cooling comprises an indirect heat exchange to fine-tune temperature of the mixed stream.

4. The method of claim 1, further comprising: separating the second drum gas stream with a membrane separator into a reactor feed and light inerts.

5. The method of claim 4 wherein the light inerts comprise about 80-100 mol % ethylene and nitrogen.

6. The method of claim 1, wherein the polyolefin is polyethylene.

7. The method of claim 1, wherein the inert impurities comprise one or more of n-butane and isopentane.

8. The method of claim 1, wherein the inert impurities comprise one or more selected from the group consisting of C4, C5, C6, C7, C8, C9, C10, C11, and C12 impurities.

9. The method of claim 1, wherein the unreacted monomers comprise ethylene and the unreacted comonomers comprise 1-hexene.

10. The method of claim 1, wherein the purge stream comprises about 25-50 mol % inert impurities.

11. The method of claim 1, wherein the second drum liquid stream comprises about 60-80 mol % of isopentane and n-butane, about 10-20 mol % 1-hexene, and about 10-20 mol % ethylene.

12. The method of claim 1, wherein the inert impurities comprise one or more of isobutane and isopentane.

13. A system for improving the efficiency in polyethylene production comprising:
   a polymerization reactor fluidly coupled to a first stage compressor;
   the first stage compressor configured to receive a stream from the polymerization reactor and create a first compressed stream;
   a cooler fluidly connected to the first stage compressor and configured to receive the first compressed stream from the first stage compressor and create a cooled stream;
   a first drum fluidly connected to the cooler with an inlet and configured to receive the cooled stream, and wherein the first drum is configured to output a first drum liquid stream via a first drum liquid outlet, to output a first drum gas stream via a first drum gas outlet, and is further configured with an indirect heat exchanger to provide additional cooling capability;
   a second compressor fluidly connected to the first drum and configured to receive the first drum gas stream from the first drum, and further configured to create a second compressed stream;
   a condenser fluidly connected to the second compressor and configured to receive the second compressed stream from the second compressor; and,
   a second drum fluidly connected to the condenser and configured to receive the second compressed stream from the condenser, and wherein the second drum is configured to output a second drum liquid stream via a second drum liquid outlet and to output a second drum gas stream via a second drum gas outlet.

14. The system of claim 13, wherein the first drum is configured to receive a portion of the second drum liquid stream as an additional input stream.

15. The system of claim 13, further comprising a membrane separator wherein the membrane separator is fluidly connected to the second drum and is configured to receive the second drum gas stream and to create a flare stream and a recycle stream.

16. The system of claim 15, further comprising a flare wherein the flare is fluidly connected to the membrane separator.

17. The system of claim 13, wherein the second drum liquid stream comprises about 60-80 mol % of isopentane and n-butane, about 10-20 mol % 1-hexene, and about 10-20 mol % ethylene.

* * * * *